Figure 1:
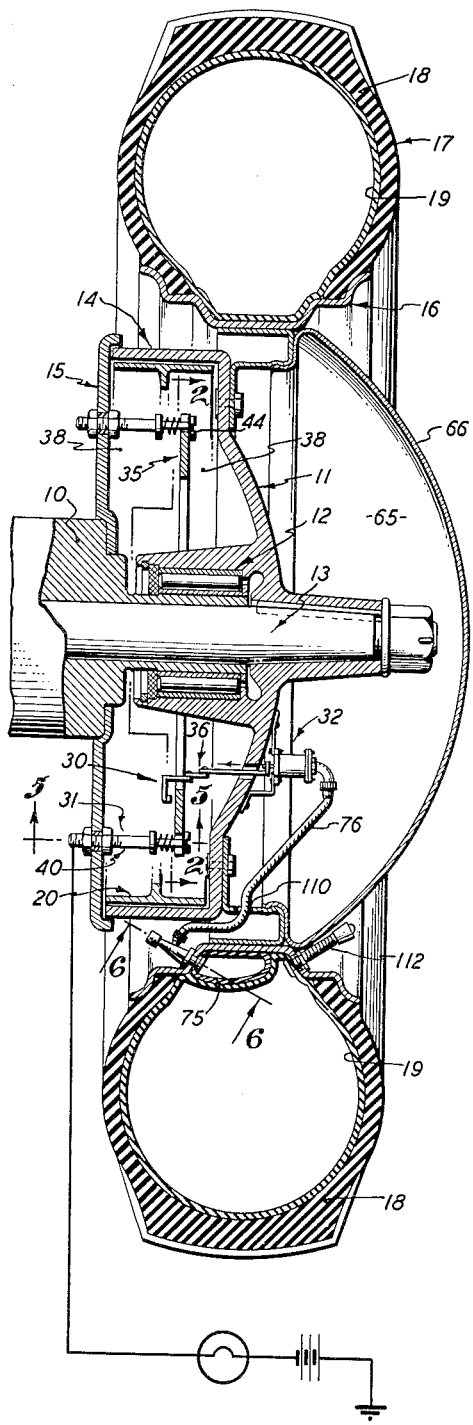

Oct. 11, 1955  J. A. RITCH, JR  2,720,638
COMBINED TIRE PRESSURE AND WHEEL UNBALANCE INDICATOR SYSTEM
Filed Oct. 10, 1952  2 Sheets-Sheet 1

INVENTOR.
JULIAN A. RITCH Jr.
BY
*[signature]*
Attorney.

Oct. 11, 1955      J. A. RITCH, JR      2,720,638
COMBINED TIRE PRESSURE AND WHEEL UNBALANCE INDICATOR SYSTEM
Filed Oct. 10, 1952      2 Sheets-Sheet 2
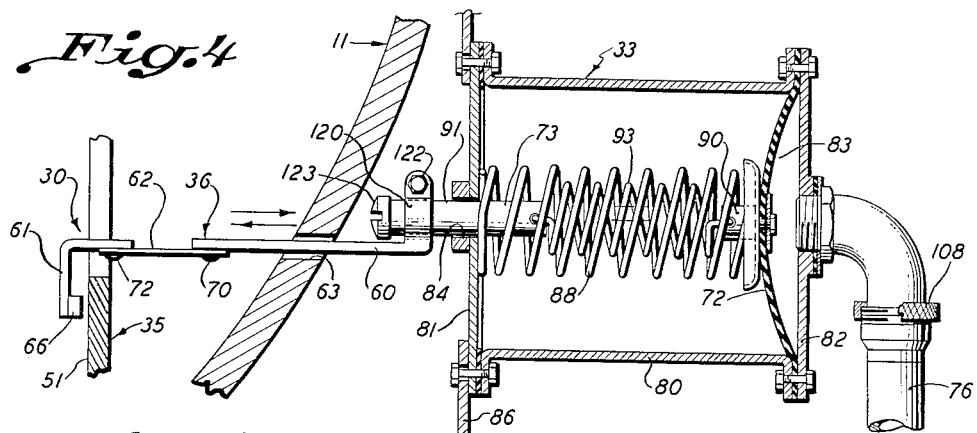
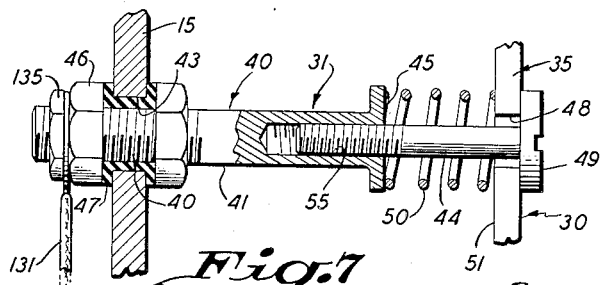
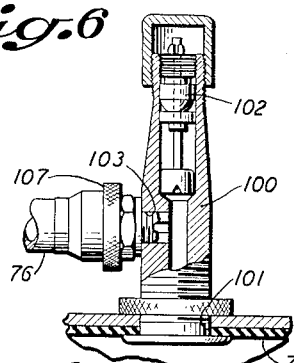
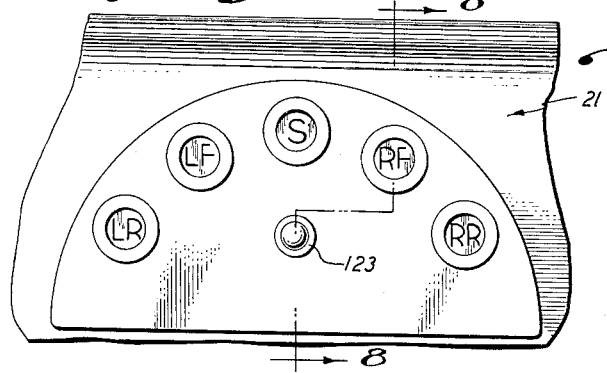
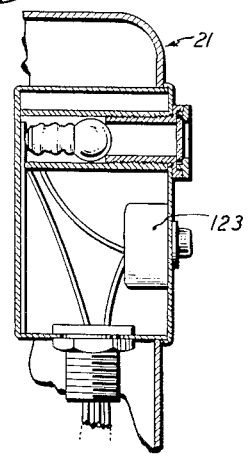
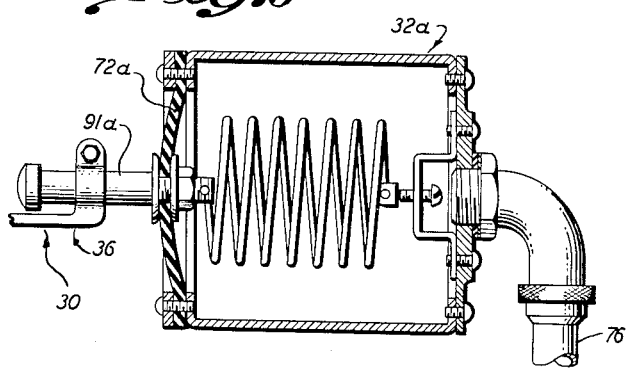
INVENTOR.
JULIAN A. RITCH Jr.
BY
Attorney.

United States Patent Office 2,720,638
Patented Oct. 11, 1955

2,720,638

COMBINED TIRE PRESSURE AND WHEEL UNBALANCE INDICATOR SYSTEM

Julian A. Ritch, Jr., Banning, Calif.

Application October 10, 1952, Serial No. 314,037

4 Claims. (Cl. 340—58)

This invention has to do with a wheel signalling device, and it is a general object of the invention to provide a simple, dependable, practical structure serving to indicate to a motorist or operator of a motor vehicle certain operating conditions of one or more of the wheels of the vehicle.

It is recognized that motor vehicles generally are preferably operated with the tires of the wheels inflated in a predetermined manner, and are preferably operated without excessive movement, that is, play or vibratory movement. The matter of gaining the desired inflation of the tires is simple. On the other hand, it is not uncommon for a vehicle to be operated over a long period of time with one or more of the tires under-inflated, since the operator is ordinarily unable to detect such conditions unless the vehicle is stopped and the tires checked. As to wheel play or looseness, and as to vibratory action of a wheel, the operator of the vehicle may detect such a condition at certain speeds, or the condition may be such that it is not detected by the operator and yet it may be such as to be dangerous or to cause excessive tire wear. The setting of wheel bearings and other such factors are checked from time ot time, as the ordinary vehicle is serviced, and it is customary in many cases for an operator to have the wheels checked for balance. It is common, however, for a wheel to get out of balance and it may operate for a long period of time in an unbalanced condition and become dangerous, or cause severe tire wear before the condition is detected.

It is a general object of this invention to provide a structure applicable to a vehicle, as for instance to an automobile, a truck, or like vehicle, and which is such as to accurately and dependably indicate to the operator of the vehicle the operating condition of one or possibly all of the wheels of the vehicle, depending upon the extent to which the invention is applied.

It is another object of the invention to provide a signalling device of the general character referred to which is such that it involves but few simple inexpensive parts, making it practical for general application to the average motor vehicle.

It is a further object of the present invention to provide a device of the general character referred to which is such that it can be paplied to a motor vehicle without disturbing or interfering with any of the usual parts thereof, and by the mere provision of a few simple holes or bored openings required to accommodate the parts provided by the invention.

It is another object of this invention to provide a signalling device of the general character referred to, including a single contact means which in practice serves to give signals of different characters, one indicating the pressure condition of the tire, while the other indicates the bearing condition or wheel vibration.

In a typical application of the invention the units of the invention are applied to or incorporated in each wheel of the vehicle, and these units are connected or coupled into a common or single signalling system. Since the structure or unit applied to each wheel is preferably the same, a consideration of one such unit will serve to give an understanding as to the character of the invention.

In a typical application of the invention the structure provided includes a contact means, which is preferably located within the drum of a wheel between the body of the wheel and the plate that is carried by the axle housing, and which serves to close the inner side of the brake drum. In a preferred form the contact means includes an annular stationary contact located around the wheel supporting axle and within the brake drum and between the wheel and the cover plate. A movable contact is provided and includes a stem adapted to reciprocate and arranged parallel with the axis of the wheel. The movable contact includes a contact head engageable with the stationary contact, preferably the inner side thereof, and a resilient coupling connects the stem and head. A mounting means supports the stationary contact preferably from the cover plate, and in a preferred arrangement it serves to electrically insulate the stationary contact and supports that contact so that it can be adjusted to a proper working position. An operating means is provided for actuating the movable contact and includes a pressure responsive element subject to the pressure prevailing in the tire provided on the wheel. In a preferred form of the invention this element is in the nature of a diaphragm which operates a rod adjustably coupled to the stem of the movable contact. In a preferred form of the invention a sealed or closed envelope is provided in or is related to the tire so that the pressure prevailing in the tire is communicated to fluid contained in the envelope. A fluid connection or duct is provided between the envelope and the pressure responsive element so that pressure prevailing in the tire is normally communicated to and acts upon the pressure responsive element. The parts are related so that when the tire is under the desired pressure there is such pressure on the pressure responsive element that the rod operating the stem of the movable contact positions that stem so that the head of the movable contact is spaced from the stationary contact. When the tire pressure drops below a predetermined value the diaphragm is in a position where the head of the movable contact engages and rubs on the stationary contact. The contact mechanism just referred to is in a circuit including a lamp, and the circuit is such that when the contacts are engaged the lamp is energized. A flexible or resilient coupling is preferably provided between the rod of the movable contact and the head of that contact, and is such that if the wheel is subjected to undesirable movement, as, for instance, movement that results from a loose or broken bearing, or such as results from an unbalanced condition, the head of the movable contact moves relative to the stem thereof and intermittently contacts the stationary contact with a resulting intermittent or broken energization of the signal lamp.

Figure 2:
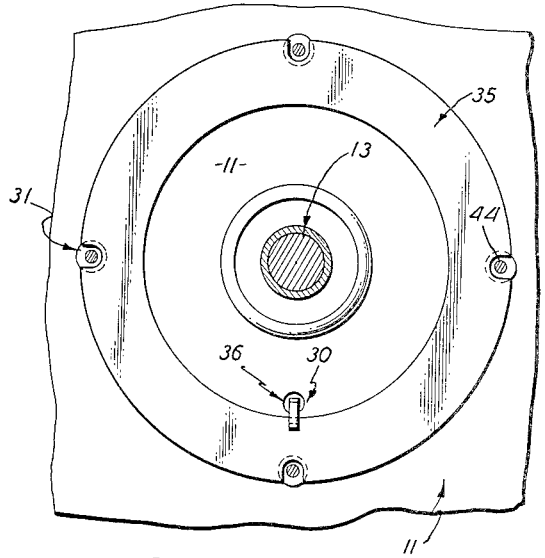
Figure 3:
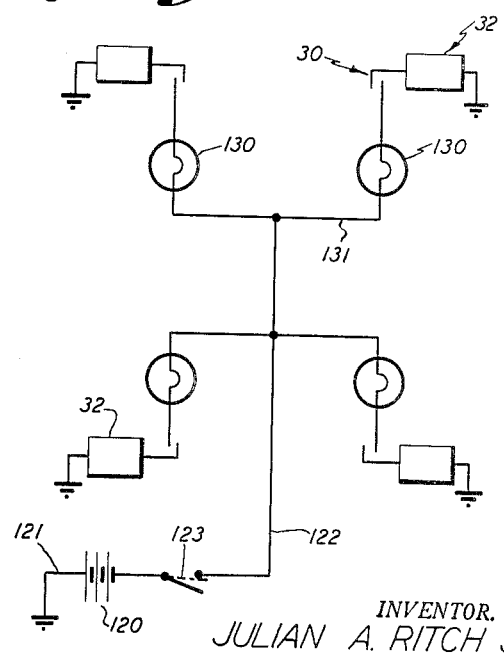

The various objects and features of my invention will be fully understood from the following detailed description of a typical preferred form and application of the invention, throughout which description reference is made to the accompanying drawings, in which:

Fig. 1 is a detailed sectional view of a typical motor vehicle showing construction provided by the present invention applied thereto. Fig. 2 is a detailed sectional view taken as indicated by line 2—2 on Fig. 1. Fig. 3 is a diagrammatic view illustrating a typical circuit as provided by the present invention. Fig. 4 is an enlarged view of a portion of the structure shown in Fig. 1. Fig. 5 is an enlarged view of another portion of the structure shown in Fig. 1. Fig. 6 is an enlarged, detailed sectional view taken substantially as indicated by line 6—6 on Fig. 1. Fig. 7 is a view illustrating a portion of the instrument board or panel of the vehicle. Fig. 8 is a sectional view taken substantially as indicated by line 8—8 on Fig. 7, and Fig. 9 is a view similar to Fig. 4 and showing another form of that portion of the structure.

The structure as provided by the present invention is applicable, generally, to wheeled vehicles and it is particularly practical as applied to motor vehicles such, for example, as motor cars and trucks. In the present disclosure reference will be made to a motor vehicle such as a motor car, and reference will be made merely to those portions or parts of the motor vehicle with which the present invention is concerned, or to which the invention is applicable.

In the drawings, certain parts of the motor vehicle are illustrated. For example, there is shown a relatively fixed or stationary part in the form of an axle housing 10. A wheel 11 is supported from the housing 10 by means of an anti-friction bearing 112. An axle 13 is carried by the housing 10 and is suitably coupled to the wheel 11 so that the wheel rotates therewith, or is driven thereby. A brake drum 14 is provided on the wheel at the inner side thereof, or so that it opens inwardly, and a cover plate 15 is carried by or formed as a part of the housing 10 to cover the inner or otherwise open side of the drum 14. A rim 16 is carried by the wheel 11 and supports a tire 17. The tire is shown as a conventional tire, including a casing 18 and an inner tube 19 within the casing, and having an inner portion bearing in the rim 16. In accordance with ordinary or conventional motor vehicle construction brake parts 20 are carried in and cooperate with the drum 14 and the vehicle is provided with an instrument board or panel 21 conveniently located relative to the operator of the vehicle.

In carrying out the invention a unit or embodiment of the invention can be applied to but a single wheel of the vehicle. However, ordinarily it is desirable that a unit of the invention be applied to each wheel of the vehicle, and these various units are incorporated in a single system or circuit, as will be hereinafter described. For the purpose of gaining an understanding of the invention a description will be given of but one embodiment or unit of the invention, it being understood that such description is applicable to each wheel or to the several units incorporated in the system applied to the vehicle.

A unit of the present invention as applied to a wheel and the parts related thereto includes, generally, a contact means 30, a mounting 31 for an element of the contact means and an operating means 32 for the movable contact of the means 30.

The contact means 30 in its preferred form includes two contacts, a fixed or relatively stationary contact 35, and a shiftable or movable contact 36. The stationary contact is preferably a flat element or plate annular in form, and it is arranged in the chamber 38 formed between the wheel 11, cover 15 and the brake drum 14. The contact 35 surrounds the bearing 12 or the parts supporting the wheel 11.

The mounting means 31 supports the stationary contact 35 in the chamber 38 so that it is concentric with the wheel and so that it is located in a plane normal to the axis of the wheel and is in a position in the chamber 38 where it is clear of the various parts included in the mechanism required in this chamber for the operation of the brake parts 20. In the drawings the contact 35 is shown mounted in a typical position in chamber 38 and, for simplicity of illustration, the typical brake operating parts have not been shown. It is to be understood, of course, that in practice various brake elements or shoe operating mechanisms are incorporated in the chamber 38 in a manner familiar to those skilled in the art.

The mounting means 31 may, in practice, vary widely in form and construction. In the case illustrated the means 31 is shown as including a plurality of circumferentially spaced posts 40 which are fixed to or carried by the cover plate 15. The posts project into the chamber 38 to support the contact 35.

Each post is shown as including an inner section 41 engaged through a bushing 42 of electrical insulating material carried in an opening 43 provided in the cover 15. The post includes an outer section 44 which is threaded to the inner section 41 and which projects from or beyond the outer end of the section 41. In the construction illustrated the inner section 41 projects a substantial distance forward from the cover 15 so that it extends a substantial distance into chamber 38 and the outer section 44 continues a substantial distance beyond the terminal end 45 of section 41.

The inner section 41 has clamp nuts 46 threaded onto it at opposite sides of the cover 15. The nuts 46 are tightened against flanges 47 of the insulating bushing and as a result of this construction the inner section 41 is solidly or rigidly supported from the cover 15 with a forward portion projecting into the chamber 38 and with a rear portion exposed at the exterior of the cover 15.

The outer section 44 of the post extends through an opening 48 provided in the outer peripheral portion of the stationary contact 35 and a head 49 is provided on the outer terminal end of section 44 to retain the contact 35 on the section 44. In the preferred construction a compression spring 50, preferably a helical spring, is arranged between the outer or terminal end 45 of section 41 and the side 51 of the contact 35 so that the contact 35 is normally held in pressure engagement with the head 49, as will be apparent from Fig. 5 of the drawings. In the particular case illustrated the outer section 44 of post 40 is threaded into a socket 55 provided in the end of the section 41.

As a result of the construction above described the several posts 40 supporting the contact 35 can be adjusted to vary the location of the contact 35, and in practice it is preferred to so adjust the post as to locate the contact 35 truly in a plane normal to the axis of rotation of the wheel.

The movable contact 36 preferably includes a stem 60 adapted to be reciprocated, a head 61 adapted to engage the contact 35, and a coupling 62 connecting the stem 60 and head 61.

The stem 60 of contact 31 extends freely through an opening 63 provided in the wheel 11 so that the stem has an inner end portion within the chamber 38 and an outer end portion at the exterior of the wheel and located in the chamber 65 that occurs between the wheel 11 and the hub cap 66 which cooperates with the wheel and which is clearly illustrated in Fig. 1 of the drawings. The stem 60 of contact 36 extends parallel with the axis of the wheel and is adapted to be moved axially or to be reciprocated by the operating means 32, as will be hereinafter described.

The head 61 of the contact 36 has a radially projecting portion with a tip part 66 adapted to engage and make contact with the stationary contact 35. In the preferred arrangement the contact 36 extends inwardly in the chamber 38 and through the annular stationary contact 36 so that the tip 66 of head 61 is located at the inner side 51 of the contact 35.

In accordance with the present invention it is preferred that the stem 60 and the head 61 of contact 36 be rigid elements, whereas the coupling 62 is a flexible or resilient element. In practice it is prefered to form the coupling or coupler 62 of spring steel, or the like, and in practice it may be a simple leaf spring, as shown in the drawings. In the preferred form of the invention the elongate leaf spring forming the coupler 62 has one end fixed to the stem 60 by a suitable fastener 70 and has its other end fixed to the head 61 by a suitable fastener 72.

The operating means 32 serves to operate or reciprocate the contact 36, and it is responsive to the pressure prevailing in the tire 17. In accordance with the preferred form of the invention, the means 32 includes an element 72 which is the pressure responsive element. A rod 73 operatably connects element 72 and the stem 60 of contact 36. A sealed or closed cell in the form of an envelope 75 is carried by the wheel at or in contact with the tire 17, so that it is under or subject to the pressure of the tire. A duct or pressure connection 76 connects the cell or envelope 75 and the element 72 so that the pressure communicated to the envelope 75 by or from the tire is communicated to element 72 with the result that the element 72 is operated and its position, and therefore the position of contact 36, is regulated or determined by the pressure in the tire.

In the preferred construction the pressure responsive element 72 is a simple diaphragm and in the case illustrated it is shown carried by a case having a cylindrical body portion 80 and end plates 81 and 82 closing the ends of the body. In the case illustrated the diaphragm 72 is located at one end of the body 80 where it is held by the end plates 82, so that there is a chamber 83 established between the diaphragm and the end plate 82. The other end plate 81 has an opening 84 that slidably guides the rod 73. In the construction illustrated the assembly of parts just described is mounted in fixed position at the outer side of the wheel 11 to be in the chamber 65. The particular mounting illustrated includes suitable brackets 86.

In practice the diaphragm 72 may be formed of a flexible or yielding material, and it may be so formed as to normally seat against the inner side of the end plate 82, whereas it assumes a bulged or deflected form when under pressure, as shown in Fig. 4 of the drawings. In practice, if desired, a suitable means such as a spring 88, may be provided to normally yieldingly urge the diaphragm 72 toward the plate 83 and to offer resistance to the deformation of the diaphragm.

In practice the rod 73 operated by the diaphragm 72 may be of any suitable form and construction. In the particular case illustrated the rod 73 is shown as including a section 90 which is fixed to the diaphragm 72, a section 91 which is slidably guided in the opening 84 and a section 93 which connects the sections 90 and 91 and which is a yielding element. The section 93 is shown as a rather heavy or stiff spring, preferably helical in form, and it is such that under ordinary operating conditions the rod formed by the elements 90, 91 and 93 is, in effect, a rigid part, whereas should the tip 66 of the head 61 be engaged with contact 35 and the diaphragm tend to move further toward the plate 83, then the section 93 of the rod 73 will allow for such movement of the diaphragm without a deformation of parts and without creating an excessive pressure, as between the contact head 61 and the contact 35.

In Fig. 9 of the drawings I have illustrated another form of operating means 32ª, in which the element 91ª is directly connected to the diaphragm 72ª.

The cell or envelope 75, as provided by the present invention, is preferably a simple, sealed or closed envelope formed of a flexible material. In practice the envelope 75 may be formed of material corresponding to that employed in the inner tube 19, and the envelope may be of any suitable form and size. It is preferred, ordinarily, that the envelope 75 be of limited size.

In accordance with the preferred arrangement the envelope 75 is located between the inner tube of the tire and the rim that carries the tire. A fitting 100 is provided on the envelope 75 and extends through an opening 101 provided in the rim 16 carrying the tire 17. The fitting 100 is shown as carrying a valve 102 which may, in practice, correspond to an ordinary tire valve, and the outer end of the fitting 100 may be formed so that the dispenser on the end of an air hose can be applied to it so that air can be introduced into the envelope to establish a pressure in the envelope which is substantially the same as that prevailing, or normally prevailing, in the tire. The fitting is shown provided with a removable cap. The fitting 100 has a side outlet 103 which is in communication with the interior of the envelope 75.

In a preferred form of the invention the duct or pressure connection 76 is a simple tube, preferably a flexible tube, connected to the fitting 100 by suitable coupling means 107 and to the end plate 82 by suitable coupling means 108. The flexible duct 76 is preferably engaged through an opening 110 provided in the wheel so that, in practice, the fitting 100 is located at the inner side of the rim, whereas the valve fitting 112 for the tire 17 is located at the outer side of the rim. It is to be understood, of course, that if desired the fitting 100 can be located at the outer side of the rim, in which case the structure will be varied so that the duct 76 extends from that point into the chamber 65 to connect to the structure that occurs at the diaphragm 72.

In a typical system or circuit embodying the invention the units in connection with the several wheels of the vehicle are connected in a common circuit. In the diagram, Fig. 3, I have illustrated a suitable source of energy such as a battery 120, and the battery circuit has one side connected to ground as by a suitable ground connection 121. The other side of the battery circuit is carried by a main line 122 which is insulated, and it is preferred that a control switch 123 be included in the main line 122. In practice the control switch 123 is preferably located in a suitable instrument 129 located at the instrument panel 21 of the vehicle.

Branches 131 of the line 122 are provided to accommodate the units provided at the wheels, there being a branch 131 for each unit of construction such as is shown in Fig. 1 of the drawings. In the preferred arrangement each branch line 131 extends to the contact means 30 at a wheel, and in a typical construction the branch line connects to one of the posts 40 of the mounting means 31 carrying the stationary contact 35. As shown in Fig. 5, the branch line 131 may be connected to the exposed end portion of the inner section 41 of the post and may be there held by a clamp nut 135 threaded onto the section 41.

With the line 131 thus in contact with the post, the circuit is carried through the post to the contact 35. When the head 61 of contact 36 is in engagement with the contact 35, the circuit through the contact means 30 is closed, the circuit being completed to ground through the contact 36 and parts of the means 32. In the particular case illustrated the circuit is completed through the stem 60 of contact 36, the section 91 of rod 73, the end plate 81 and the brackets 86 that support the case 32.

With the construction provided the stationary contact 35 is preferably set or adjusted so that when the tire 17 is under the desired pressure the diaphragm 72 is in a position where the head 61 of contact 36 is suitably spaced from the stationary contact 35. The spacing thus provided is such that when a predetermined drop in pressure occurs in the tire the diaphragm 71 will move toward the end plate 82 a sufficient amount to cause the contact head 61 to be engaged with the stationary contact 35.

In practice an adjustment may be provided between the stem 60 of contact 36 and the rod 73 of the means 32 that operates the contact 36. In the construction illustrated the section 91 of rod 73 projects from the exterior of case 32 and the stem 60 of the contact 36 has a split sleeve 120 which surrounds the projecting portion of section 91 and is normally set or clamped thereon by a clamp screw 122. In the particular construction illustrated a head 123 is provided on the section 91 to prevent displacement of the sleeve from section 91.

With the construction just described it will be apparent that by adjustment of the posts 40 of the mounting means 31, or by adjustment of the coupling provided between the stem 60 and the rod 73, the desired positioning and spacing of the contacts 35 and 36 can be readily effected.

In accordance with the invention a suitable indicating or signalling means is provided, so that the operator of the vehicle is made aware of actuation of the device, as when the contact 36 engages the contact 35. In the preferred construction an indicating lamp 130 is provided in each branch line 131 and the lamps 130 are preferably located at the instrument 129 which is located at, or is mounted from, the instrument board 21.

When the construction is properly installed and adjusted, the vehicle having the tires 17 properly inflated and the wheels properly mounted and balanced, it will operate indefinitely without any signalling, that is, without energization of any of the lamps 130. Should the air pressure in any one of the tires of the vehicle drop below a safe, or below the desired, pressure then the diaphragm 72 of the means 32 will have moved to a position where contact head 61 will engage the contact 35. This results in a closing of the circuit through the parts related to the wheel carrying the tire mentioned, and as a result the lamp in the branch line 131 to that wheel will become energized. Under this condition the contact head 61, or the tip 66 thereof, will remain continuously in engagement with the contact 35 or will be substantially continuously engaged therewith so that the said energized lamp will remain continuously energized, or practically so.

Should the bearing of the wheel become loose or in any way impaired, so that there is play in or improper operation of the wheel, or should the wheel become unbalanced for any reason whatsoever so there is vibration thereof, then the flexible or spring coupling 62 included in contact 36 between stem 60 and head 61 will operate so that the head 61 vibrates or moves relative to the stem 60. As a result of the construction provided by the present invention, a nominal amount of vibration of the wheel, or a slight looseness or improper adjustment of the wheel, will result in such movement or vibration of the head 61 as to cause the tip 66 of head 61 to contact the contact 35. When this action occurs, there is an intermittent closing of the circuit and, consequently, a blinking of the signal lamp in the circuit to the wheel where this action occurs. The operator is thus able to immediately detect the fact that the wheel is vibrating or is operating improperly and that the inflation of the wheel is not involved.

Having described only a typical preferred form and application of my invention, I do not wish to be limited or restricted to the specific details herein set forth, but wish to reserve to myself any variations or modifications tht may appear to those skilled in the art and fall within the scope of the following claims:

Having described my invention, I claim:

1. A tire pressure and balance indicating device applicable to a vehicle wheel carrying an inflated tire and having a brake drum related to a fixed cover therefor including, a stationary annular contact within the drum, a movable contact carried by the wheel and adapted to move axially of the wheel into and out of engagement with the stationary contact, operating means adapted to operate the movable contact and including a pressure responsive element coupled with the movable contact and a pressure connection from the tires to said element and signaling means controlled by said contacts, the movable contact having a flexible part and being responsive to vibratory action of the wheel to be operated thereby into engagement with the stationary contact.

2. A wheel balance and tire pressure indicator applicable to a vehicle wheel carrying an inflated tire and having a brake drum related to a fixed cover therefor including, a stationary annular contact within the drum, a movable contact carried by the wheel and adapted to move into and out of engagement with the stationary contact, operating means for the movable contact and responsive to the pressure carried by the tire, and signaling means controlled by the contacts, a spring on the operating means and carrying the movable contact, the movable contact being responsive to vibratory action of the wheel and being adapted to be operated thereby into engagement with the stationary contact.

3. A tire pressure and wheel balance indicating device applicable to a vehicle wheel carrying an inflated tire and having a brake drum related to a fixed cover therefor including, a stationary annular contact within the drum, a movable contact carried by the wheel and adapted to move into and out of engagement with the stationary contact, operating means adapted to operate the movable contact and responsive to the pressure carried by the tire, and signaling means controlled by the contacts, the movable contact being responsive to vibratory action of the wheel and being adapted to be operated thereby into engagement with the stationary contact, the movable contact including a head engageable with the stationary contact and a resilient element carrying the head.

4. A tire pressure and wheel balance indicating device applicable to a vehicle wheel carrying an inflated tire and having a brake drum related to a fixed cover therefor including, a stationary annular contact within the drum, a movable contact carried by the wheel and adapted to move into and out of engagement with the stationary contact, operating means adapted to operate the movable contact and responsive to the presure carried by the tire, and signalling means controlled by the contacts, the movable contact being responsive to vibratory action of the wheel and being adapted to be operated thereby into engagement with the stationary contact, the movable contact including a stem operated by the operating means, a head engageable with the stationary contact, and a leaf spring connecting the stem and head.

References Cited in the file of this patent

UNITED STATES PATENTS

| | | |
|---|---|---|
| 2,334,443 | Schubert | Nov. 16, 1943 |
| 2,347,541 | Critser et al. | Apr. 25, 1944 |
| 2,524,968 | Eriksen et al. | Oct. 10, 1950 |